United States Patent
Schwarz (10) Patent No.: US 9,039,498 B2
(45) Date of Patent: May 26, 2015

(54) CONVEYING APPARATUS COMPRISING A CONVEYING PATH AND DESIGNED TO SUPPLY A PLURALITY OF PRODUCTS FOR CONSUMPTION HAVING SOFT PARTS TO A PROCESSING DEVICE, AND PROCESSING MACHINE COMPRISING A CONVEYING APPARATUS AND A PROCESSING DEVICE

(71) Applicant: NORDISCHER MASCHINENBAU RUD. BAADER GMBH + CO. KG, Lubeck (DE)

(72) Inventor: Olaf Schwarz, Wismar (DE)

(73) Assignee: Nordischer Maschinenbau Rud. Baader GmbH + Co. KG, Lubeck (DE)

( * ) Notice: Subject to any disclaimer, the term of this patent is extended or adjusted under 35 U.S.C. 154(b) by 0 days.

(21) Appl. No.: 14/355,354

(22) PCT Filed: Nov. 8, 2012

(86) PCT No.: PCT/EP2012/072176
§ 371 (c)(1),
(2) Date: Apr. 30, 2014

(87) PCT Pub. No.: WO2013/072247
PCT Pub. Date: May 23, 2013

(65) Prior Publication Data
US 2014/0308886 A1    Oct. 16, 2014

(30) Foreign Application Priority Data
Nov. 14, 2011   (EP) .................................. 11189014

(51) Int. Cl.
*A22C 25/17*   (2006.01)
*B65G 15/14*   (2006.01)
*A22C 25/08*   (2006.01)

(52) U.S. Cl.
CPC ............. *B65G 15/14* (2013.01); *A22C 25/08* (2013.01); *A22C 25/17* (2013.01)

(58) Field of Classification Search
USPC ......................... 452/125, 127, 134, 156–158
See application file for complete search history.

(56) References Cited

U.S. PATENT DOCUMENTS 2,565,727 A * 8/1951 Henderson .................... 452/158
2,659,402 A * 11/1953 Townsend ..................... 452/127
(Continued)

FOREIGN PATENT DOCUMENTS

EP    0 445 892 A1    9/1991
EP    2 210 495 A1    7/2010

OTHER PUBLICATIONS

International Search Report; International File Date: Nov. 8, 2012; Nordischer Maschinenbau Rud. Baader GmbH + Co. KG; 3 pgs.

*Primary Examiner* — Richard Price, Jr.
(74) *Attorney, Agent, or Firm* — Sunstone IP (57) ABSTRACT

A conveying apparatus has a conveying path to supply a plurality of products for consumption having soft parts and intended for processing to a processing device. A conveying intermediate space has conveying surfaces that face one another and receive the products for consumption between them while applying pressure thereto. A first conveying surface comprises a flexible surface-deformable conveying cover and a row arrangement of pressure elements that are arranged next to one another in a row extending transverse to the conveying direction, each having a pressure-applying transverse profile extending transverse to the conveying direction, and are held to be displaceable in the height dimension direction of the conveying intermediate space against a restoring force such that each pressure element co-operates with the surface-deformable conveying cover during the passage of the products for consumption through the conveying path in order to form a variable conveyor cross-section.

18 Claims, 6 Drawing Sheets

(56) References Cited

U.S. PATENT DOCUMENTS

| | | | |
|---|---|---|---|
| 5,090,939 A * | 2/1992 | Leblanc | 452/127 |
| 5,267,890 A * | 12/1993 | Koch et al. | 452/125 |
| 6,129,625 A | 10/2000 | Cate et al. | |
| 6,558,242 B2 * | 5/2003 | Veldkamp et al. | 452/134 |
| 6,659,856 B2 * | 12/2003 | Long | 452/127 |
| 2003/0008607 A1 | 1/2003 | Long | |
| 2010/0317274 A1 | 12/2010 | Parisini et al. | |

* cited by examiner

CONVEYING APPARATUS COMPRISING A CONVEYING PATH AND DESIGNED TO SUPPLY A PLURALITY OF PRODUCTS FOR CONSUMPTION HAVING SOFT PARTS TO A PROCESSING DEVICE, AND PROCESSING MACHINE COMPRISING A CONVEYING APPARATUS AND A PROCESSING DEVICE

CROSS-REFERENCE TO RELATED APPLICATIONS

This application claims priority to PCT/EP2012/072176, having a filing date of Nov. 8, 2012 which claims priority to European Patent Application 11189014.1 having a filing date of Nov. 14, 2011, the entire contents of each of which are hereby incorporated by reference.

FIELD OF TECHNOLOGY

The following relates to a conveying apparatus with a conveying path, designed to supply a plurality of sequential, similar products for consumption having soft parts and intended for processing and oriented longitudinally in the conveying direction, which products each have a variable profile cross-section transverse to the conveying direction and determined by a width and height dimension, with particularly falling or rising soft part areas, to a processing device, comprising at least one conveying section with conveying surfaces that face one another, which are arranged over one another in the dimension corresponding to the height dimension of the products for consumption to be processed and, with the application of pressure, come into contact with the products for consumption accommodating them therebetween in such a manner that between the conveying surfaces a conveying intermediate space is formed adapted during conveyance to the form of each profile cross-section of the conveyed products for consumption with a variable conveyor cross-section in the width and height dimension, wherein the one first conveying surface comprises a flexible, surface-deformable conveying cover which comes into contact with the conveyed products for consumption and is movable in the conveying direction by means of a conveyor drive and further comprises a row arrangement of pressure elements that are arranged next to one another in a row directed transverse to the conveying direction, covering each width of the conveying space, stationary on the conveying apparatus, each having a pressure-applying transverse profile extending transverse to the conveying direction, and being held to be displaceable in the height dimension of the conveying intermediate space against a restoring force such that each pressure element co-operates with the surface-deformable conveying cover during the passage of the products for consumption through the conveying path in order to form a variable conveyor cross-section and to work against the products for consumption.

BACKGROUND

The invention also concerns a processing machine comprising at least a processing device with at least one cutting tool for separating at least a part of products for consumption conveyed in a row and an associated and referenced conveying apparatus upstream of the processing device, wherein the processing device is arranged directly at the end of a conveying section intermediate space of the conveying apparatus which conveys the products for consumption in a row.

The generic conveying apparatus is known as a component of a skinning machine for fish fillets. The conveying apparatus is arranged closely in front of the blade of a band knife. A fish fillet placed on the second conveying surface, skin side down, particularly with its tail end first, is transported through the conveying intermediate space. The second conveying surface is an inflexible, non-deformable counter-surface. Upon entry into the conveying intermediate space, the pressure elements are contacted and individually raised depending on the height and/or profile cross-section dimension of the fish fillet. In this way, the fish fillet is fed in a straight position to the band knife, which particularly separates a thin layer, removing the silverskin. Skin removal should take place without cutting loss and without forming isolated patches of skin. Known pressure elements in the form of fingers are provided for pressing of the first conveying surface. With the objective of holding the fish fillets in a straight position and pressed evenly in their width on the counter-surface, the known fingers have been provided with a flat profile which has a flat pressure-applying surface with lateral rounded edges. It has been assumed that at usual conveying speeds (such as 80 m/min) such a flat profile is suited for defined pressing of fillets onto the second conveying surface, even with larger dimensions and with a particularly thin abdominal flap area. However, it has been found that particularly in the area of a thin visceral cavity in the width dimension, external fingers are no longer raised or are raised insufficiently, so that— consequentially—the meat is pushed together inwardly to the centre of conveyance, even if only a little. Generally, the next outer finger should cause compression toward the middle of the conveying path, even if only a little. In any case, the result of deep skinning of fillets with larger dimensions, such as salmon fillets, pressed by known pressing fingers is unsatisfactory.

Accordingly, the invention has assumed the object of significantly improving the application of the deformable conveying surface to the products for consumption having soft parts and intended for processing in order to obtain products for consumption at the exit of the conveying apparatus in an optimal uniform, defined position, even largely independent of very diverse dimensions for the products for consumption, said position enabling subsequent processing to be performed reliably and without disturbance and/or incorrect processing.

SUMMARY

The task and/or objectives of the invention are accomplished according to the invention in conjunction with the features of the aforementioned conveying apparatus in that pressure elements forming at least a partial row are each designed with a pressure-applying surface that determines the pressure-applying transverse profile, which pressure-applying surface is formed to have a convex profile cross-section over the entire pressure-applying transverse profile in order to apply pressure to the conveying cover and against the passing products for consumption. Likewise, the task and objectives are accomplished according to the invention with an aforementioned processing machine in that the conveying apparatus arranged upstream of the processing device is designed according to the invention.

It has been found that a series of advantages is achieved with the measures according to the invention. Between adjacent pressure points of the pressure elements, largely uniform pressure distances are established on the conveying cover in the positions pushed by the consumable product. The pressure elements according to the invention have a distinctive convex, outward curvature along their entire profile cross-section, with a contact length in which, depending on the height and/or cross profiles of the products for consumption, they achieve indirect contact on these. This leads to optimal results in co-operation with the first surface-deformable conveying surface at the usual conveying speeds, and also at higher conveying speeds, and for products for consumption to be processed with very diverse, even relatively large dimensions. The products for consumption, particularly salmon fillets, which are conveyed particularly tail-first, can now be deep-skinned without errors in a conventional band knife station. The position of the products for consumption to be processed is defined in each case before the processing tool. An optimal application of the first conveying surface is achieved in conjunction with the pressure elements on the surface of the products for consumption or fillets. Folds or compressions in the body or meat of the product for consumption which lead to defects are avoided reliably, and very fine processing, such as separation of particularly thin skin, is possible.

The conveying section of the intermediate space, i.e. the two conveying surfaces takes the products for consumption to be conveyed in the conveying direction without slippage, and they move essentially at the same conveying speed. The surface-deformable conveying cover is furnished such that and particularly pre-tensioned such that it adapts to the contour of the passing products for consumption in co-operation with the pressure elements. It is expedient to form the conveying cover by a transport sector of a revolving transport belt under tension and movable by means of a conveyor drive, said transport sector taking the products for consumption with it for conveyance. Fundamentally, the second conveying surface is a transport contact surface shaped to form a flat counter-surface. A sliding contact is formed between the conveying cover or the transport belt and the pressure elements.

Although it is possible that only a partial row of pressure elements with the convex pressure-applying surfaces is provided for special treatment or adaptation respectively assigned to areas of the products for consumption, preferably all pressure elements are each designed with the convex pressure-applying surface. In fact, the convex pressure-applying surfaces can be variously designed particularly in groups or rows to adapt to particular dimensions of the products for consumption. Preferably, however, the convex pressure-applying surfaces are all designed the same. It is expedient that all pressure elements with a convex pressure-applying surface are designed with at least a partial row the same and are at least essentially arranged equidistantly in the width dimension of the conveying section of the intermediate space.

Preferably, the pressure elements are arranged close together such that they nearly touch. Correspondingly, it is advantageous for the spacing between adjacent convex pressure-applying surfaces to be small in relation to the convex profile cross dimensions of adjacent pressure-applying surfaces.

At least a partial row with pressure elements each having the convex pressure-applying surface can be allocated to a rising or falling soft part area of products for consumption to be conveyed.

A particularly advantageous and preferred embodiment consists of the pressure elements comprising rod-shaped elements extending over the conveying intermediate space corresponding to the conveying direction, which are in particular hinged to be pivotably moveable against a restoring force on a pivot axis oriented transversely to the conveying direction. A basic embodiment consists of the pivot axis being arranged on an entry side of the conveying section of the intermediate space and the rod-shaped elements each being attached to the pivot axis on their one end. A further preferred and particularly advantageous embodiment consists of the convex pressure-applying surface being formed by the surface of a circle section of the pressure-applying profile of the pressure element. It is advantageous for the distance between adjacent pressure elements to be small compared to the radius of a circle section.

A preferred embodiment consists of the convex pressure elements at least of a partial row of pressure elements being formed by cylindrical elements extending in the conveying direction and having a circular cross-section forming the convex pressure-applying surface. An advantageous embodiment consists in that the circular cylindrical elements are rollers extending in the conveying direction, which preferably are mounted to rotate freely on their roller axes. The rod-cylinder length or roller length constitutes a contact length within which the pressure elements indirectly come in contact with the products for consumption with their convex pressure-applying surfaces via the deformable conveying surface.

The processing device of a processing machine according to the invention can be designed with a cutting tool which works transversely to the conveying direction, said tool being designed to separate a particularly thin surface layer from a side of conveyed products for consumption which lie flat on the second conveying surface, particularly for removing a surface layer on the underside of fish fillets.

The processing machine can readily be used as a skinning machine. This comprises, for example, two separating stations for removing first an upper normal layer and then a deep layer on the underside of fish fillets, wherein at least a conveying apparatus according to the invention is arranged upstream of the separating station for separating the deep layer. An embodiment consists of the conveying apparatus upstream of the second separating station and the conveying apparatus upstream of the first separating station being components of a common means of conveyance which comprises a driven transport belt having a transport sector which extends from an area upstream of the first separating station up into the area of the second separating station. Both conveying apparatuses can be designed as conveying apparatuses according to the invention with pressure elements having the convex pressure-applying surfaces.

The skinning machine can also comprise only a single separating station with a conveying apparatus according to the invention assigned to it.

Dependent claims are based on the embodiments of the invention described and on other expedient and advantageous embodiments. Only particularly expedient and advantageous forms and options of design are described in more detail based on the following description of the exemplary embodiments represented in the schematic drawing. Each individual or detail design in an exemplary embodiment is to be understood as an independent detailed example for other implementations and designs in the scope of the invention which are not described or not described completely.

BRIEF DESCRIPTION

It is seen in.

DETAILED DESCRIPTION

Figure 1:
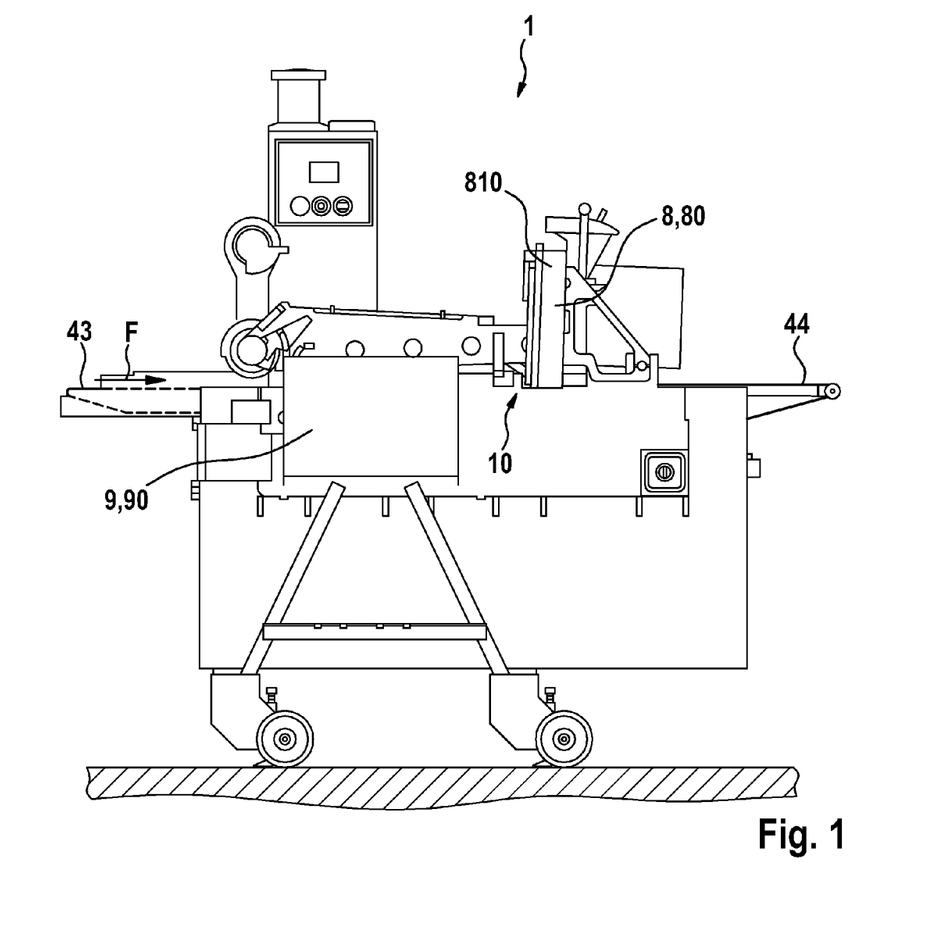
FIG. 1 a side view of a processing machine according to the invention for skin removal from fish fillets, comprising an inventive conveying apparatus.

According to FIG. 1 a processing machine 1 according to the invention is designed as a skinning machine for removing skin from products 11 for consumption having soft parts, specifically fish fillets 110. Along a processing line extending in the conveying direction F, there is provided a front processing device 9 (situated upstream), namely a first separating station 90 for separating a normal layer, while a processing device 8, specifically a separating station 80 for separating a deep layer, is located in a subsequent area (situated downstream). From FIG. 2 it is seen that the fish fillets 110 are conveyed tail-first sequentially on their skin side. They are fed in on a driven transport belt 43.

Figure 2:
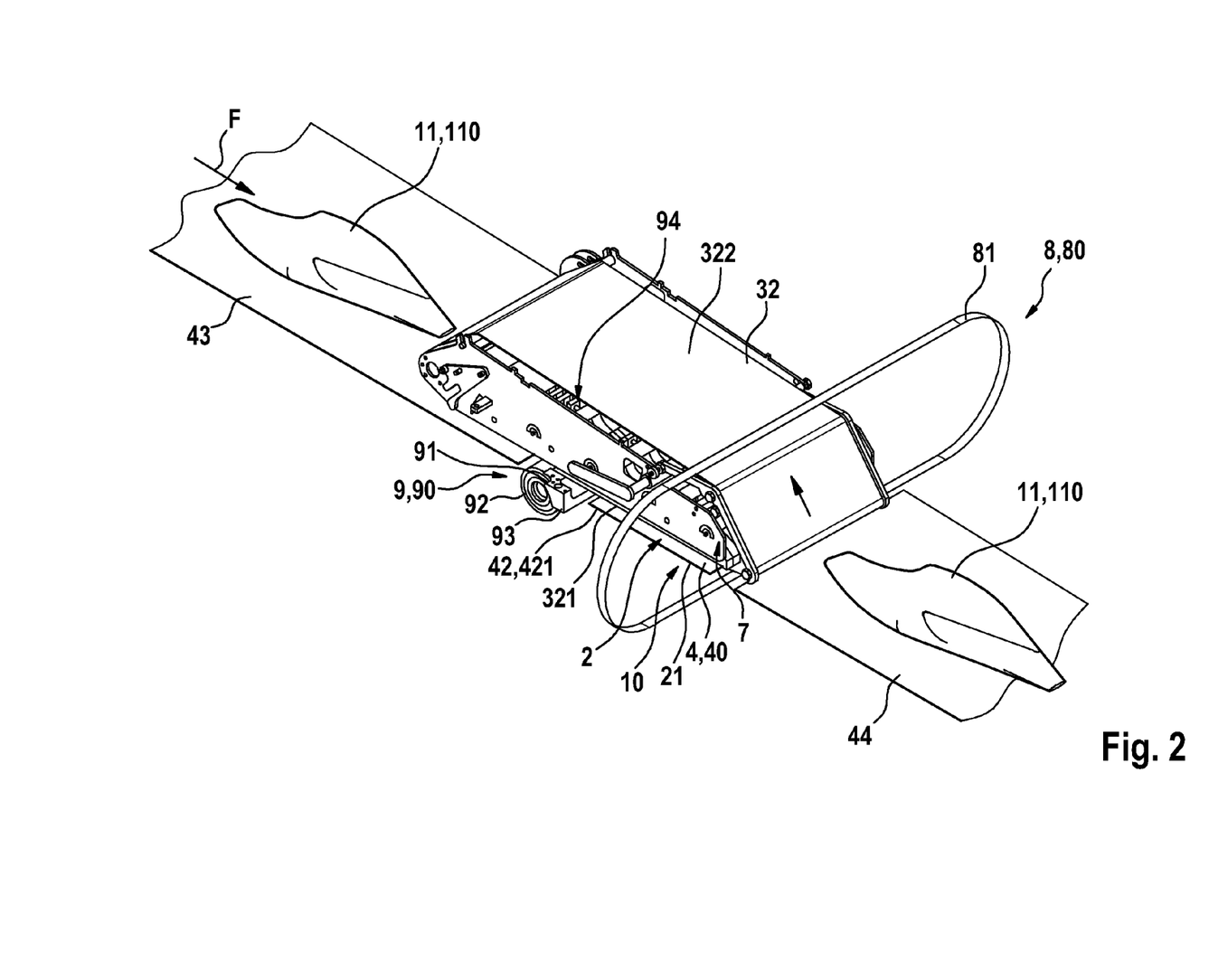
FIG. 2 an axonometric view of a conveying apparatus according to the invention, as it is part of the processing machine in FIG. 1.

The arrangement of the two separating stations 80, 90 is known per se. As seen from FIG. 2, the separating station 90 comprises in a usual combination a driver roller 92 and a pressure shoe 93 which form an intake gap 91 for separating the normal layer. The separating station 80 comprises a knife housing 810 in which a cutting tool 81 is arranged, which is formed in the usual way by a continuous band knife, between a centre transport belt 42 and an output-side transport belt 44. The band knife is seen in FIG. 2 without the drive means and means of support. The drives of the conveyor belts are not shown.

The separating station 80 is described in more detail below. A conveying apparatus 10 according to the invention is arranged upstream of the separating station 80. This comprises a conveying section 21 with a first, upper conveying surface 3 and a second, lower conveying surface 4 facing each other. The conveying surfaces 3, 4 which face each other are arranged over one another in the dimension corresponding to the height dimension of the fish fillets 110. The lower conveying surface 4 is formed by a transport sector 421 of the transport belt 42. The upper conveying surface 3 comprises pressure elements 5 of a pressure device 7 and a deformable conveying cover 31, which is formed by the transport sector 321 of a revolving, driven, flexibly surface-deformable transport belt 32. In the state without conveyance the transport sectors 321, 421 lie flat parallel to each other, for example. They form a conveying intermediate space 2. The transport sector 421 forms a rigid, table-like, flat counter-surface 40.

Figure 3:
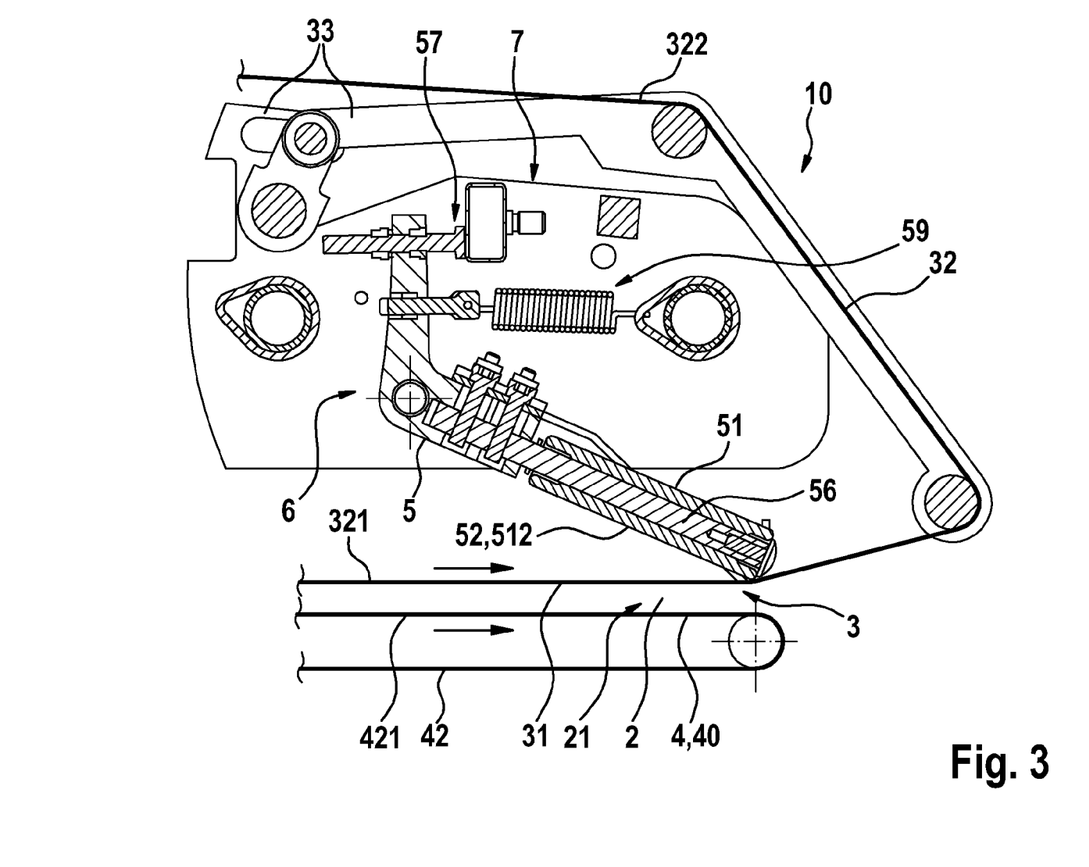
FIG. 3 a partial longitudinal section of the conveying apparatus from FIG. 2 in the area of the conveying intermediate space according to the invention.

The pressure device 7 is constructed according to the invention between the transport sector 321 and a return sector 322 of the revolving transport belt 32. The pressure device 7 comprises, as seen in FIGS. 3 and 5A to 5D, a row arrangement of the pressure elements 5 which are arranged adjacent to each other in a row oriented perpendicularly to the conveying direction F, completely covering the width of the conveying intermediate space 2, stationary on a frame (not shown) of the conveying apparatus 10. In the exemplary embodiment, the pressing row comprises fourteen pressure elements 5 arranged close together, i.e. closely spaced without contact and equidistantly. The pressure elements 5 comprise rod-shaped elements, each with a pressure head or end area 511 which lies in sliding contact on the transport sector 321 and in FIG. 3B is in the initial position without conveyance. The transport belt 42 is held under tension by tensioning means 33 in such a way that it always lies sufficiently taut on the pressure head 511.

As particularly seen in FIG. 3, each pressure element 5 is connected by a threaded connection 55 with the pressing-side operating arm 541 of an angle piece 54. The angle pieces 54 are individually supported by means of a pivoting device 6, namely around a pivot axis 60 stationary in the apparatus, which extends perpendicularly to the conveying direction F and parallel to the counter-surface 40. The angle pieces 54 are each connected on a free angle arm 542 with the tension spring of a tension spring assembly 59, which produces swivel restoring force if the conveying intermediate space 2 is expanded by upward deflection of the associated pressure element 5. A stop device 57 comprises a stop which is stationary in the apparatus, against which each free angle arm 542 strikes with a stop pin to establish the normal/initial position under the influence of the restoring force. As seen in FIG. 3, all pressure elements 5 are located in congruent initial positions in the same angular position with a sharp angle with respect to the transport sector 321. The pivot axis 60 hinging the pressure elements 5 extends on an entry side of the conveying section 21 of the intermediate space so that the pressing ends of the pressure heads 511 on the exit side of the conveying section 21 of the intermediate space lie sliding against the revolving transport belt 32 which is held under sufficient tension.

Figures 4A, 4B:
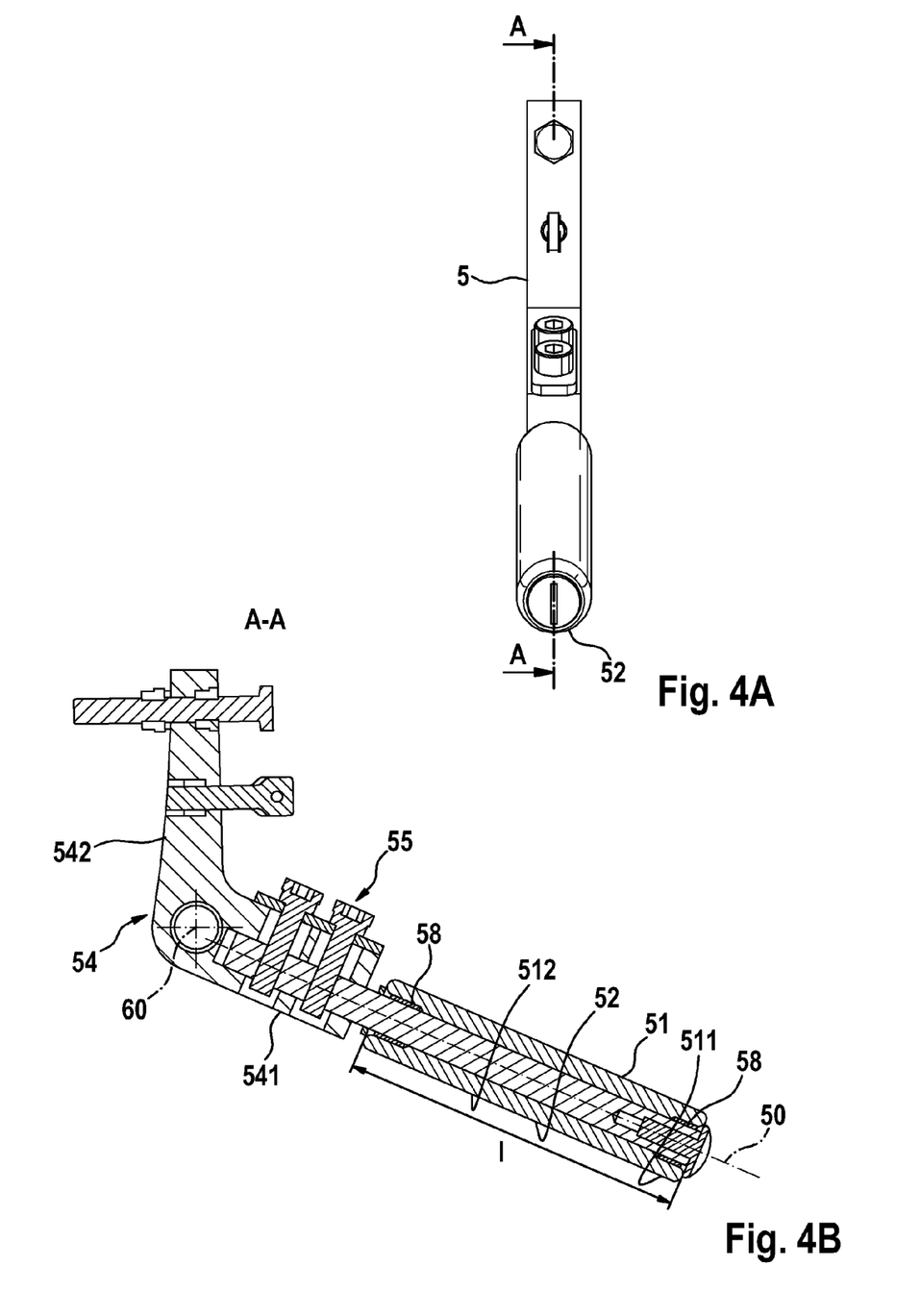
FIGS. 4A and 4B a top view and sectioned side view of a pressure element according to the invention.
Figure 5A:
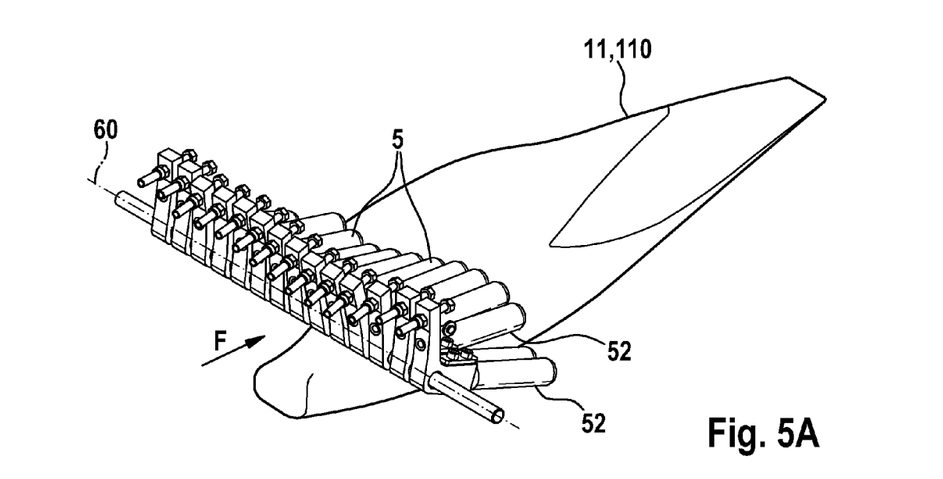
FIG. 5A to 5D positions and settings of pressure elements for a conveying apparatus according to the invention during passage of fish fillets.
Figure 5B:
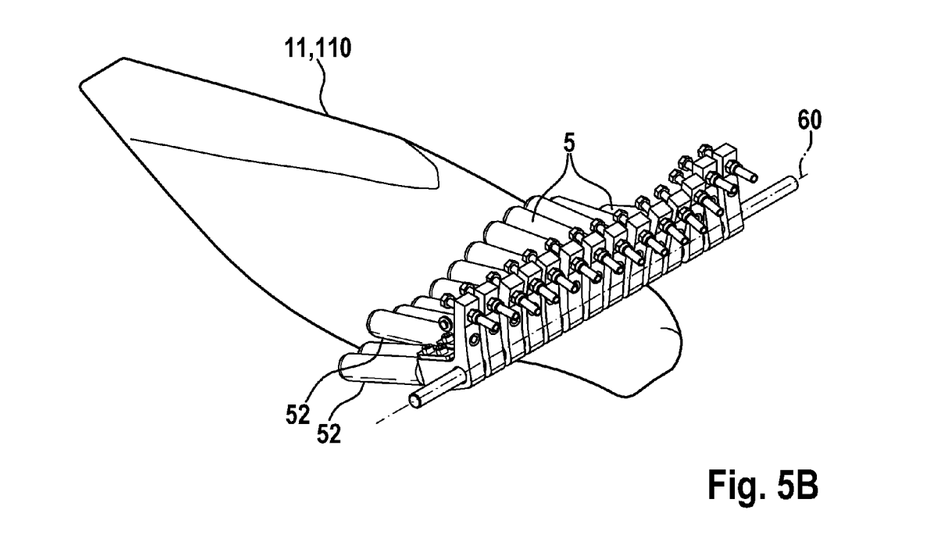
Figure 5C:
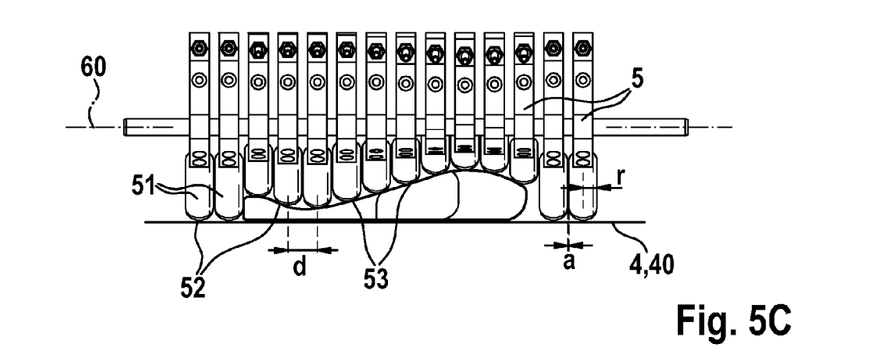
Figure 5D:
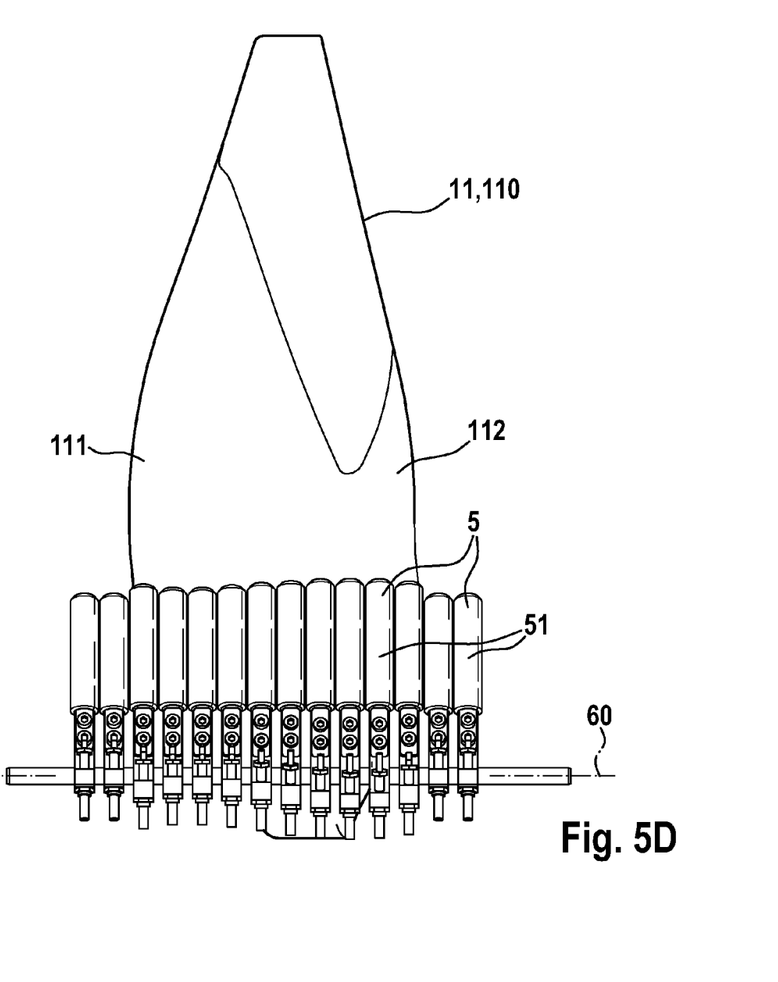

As seen particularly in FIGS. 4A, 4 B and 5A to 5D, the pressure elements 5 are each designed with a pressure-applying surface 52 which determines a pressure-applying transverse profile. According to the invention, this is convex-shaped in the profile cross-section over the entire pressure-applying transverse profile to apply pressure to the conveying cover 31. It is recognizable that the pressure-applying surface 52 of the pressure elements 5 arranged to swivel comprises an area of the pressure head 511 and, formed in bulk, a contact section 512 having a section length 1, in the area of which the product 11 for consumption entering the conveying space encounters the pressure elements 5 according to size and cross-section.

In the exemplary embodiment, the convex pressure-applying surface 52 is formed by the surface of a circle section of the pressure-applying profile of the pressure element 5. This form is achieved by the rod-shaped pressure element being formed by a cylindrical element with a circular cross-section, the cylinder surface of which forms the convex pressure-applying surface 52 at least by a circumferential section.

According to the exemplary embodiment, each pressure element 5 is further particularly formed by the cylindrical element being formed by a freely rotatable pressure roller 51 in the form of a hollow roller body or a barrel which is supported to rotate on an axle or bearing rod 56, which is attached on the operating arm 541 of the angle piece 54 by the threaded connection 55. The rotating connection comprises bearing bushes 58 placed between the pressure roller 51 and the axis rod 56 for sliding movement support.

As seen particularly in FIG. 5A to 5D, it is advantageous that the distance a between two pressure elements 5 be chosen smaller compared with the radius r of the circular convex pressure-applying surface 52. For example, r=8 mm and a=1 mm is chosen, so that the ratio a/r is ⅛. Generally it is advantageous to set the ratio in this order of magnitude.

FIG. 5A to 5D show a conveying position of a fish fillet 110 for visualization. To simplify the representation, the deformable transport sector 321 of the transport belt 32 is not shown, and the transport sector 421 is also only visible as a dash-dotted line in FIG. 5C. It is generally important that the conveying cover 31, i.e. the transport belt 32 or its transport sector 321, in co-operation with the pressure elements 5 being held under pressure force adapt exactly to the contour of the fish fillet 110 facing the pressure elements 5, i.e. the meat side, while the transport belt remains free of folds, crushed or bulging areas.

In the position shown, the fish fillet 110 has already largely been conveyed through the conveying intermediate space 2. The pressure elements 5 are more or less deflected widely depending on the width dimension, the height dimension and the length dimension of fish fillet 110 in the abdominal flap area 111 and in the loin area 112. In co-operation with the contact of the pressure elements 5 under restoring force against the transport sector 321 of the transport belt 32 or against the passing fish fillet 110, largely uniform pressure distances d are achieved between two pressure points 53 each, which are determined essentially by punctual pressing contact or linear pressing contact in the conveying direction F and tangentially in the transverse direction to it. Areas of the fish fillet 110 which have a bulging cross-section with sections which fall or rise a lot relatively are also pressed on the counter-surface 40 for optimal flat arrangement of the skin side. Apparently, the yielding of the belt edges of the transport belt 32 towards the middle of the belt is aided, with the consequence that the product for consumption, in particular fish fillet 110 is conveyed free of bulging and fold formations. As a consequence of this the subsequent processing is able to be performed without defects, with greatest precision and smallest adjustment dimensions. The band knife of the separating station 80 separates the deep layer without defects. It has been found that in particular the thin abdominal flap area 111 of the fish fillet 110 is engaged and pressed reliably without deformation transverse to the conveying direction.

The separating station 90 seen in FIGS. 1 and 2 can also be equipped with a pressure device 94 arranged inside the revolving transport belt 32. This exerts pressing pressure on the fish fillet 110 in the area of the intake gap of the separating station 90. The pressure device 94 can also be expediently designed according to the invention with a row of convex pressure elements. Then an associated conveying intermediate space is formed between the revolving transport belt 32 and a conveying counter-surface formed by the driver roller 92.

The invention claimed is:

1. Conveying apparatus with a conveying path, designed to supply a plurality of sequential, similar products for consumption having soft parts and intended for processing and oriented longitudinally in the conveying direction, which products each have a variable profile cross-section transverse to the conveying direction and determined by a width and height dimension, with particularly falling or rising soft part areas, to a processing device, comprising at least one conveying section with conveying surfaces that face one another, which are arranged over one another in the dimension corresponding to the height dimension of the products for consumption and, with the application of pressure, come into contact with the products for consumption accommodating them therebetween in such a manner that between the conveying surfaces a conveying intermediate space is formed adapted during conveyance to the form of each profile cross-section of the conveyed products for consumption with a variable conveyor cross-section in the width and height dimension, wherein the one first conveying surface comprises a flexible, surface-deformable conveying cover which comes into contact with the conveyed products for consumption and is movable in the conveying direction by a conveyor drive and further comprises a row arrangement of pressure elements that are arranged next to one another in a row directed transverse to the conveying direction, covering each width of the conveying space, stationary on the conveying apparatus, each having a pressure-applying transverse profile extending transverse to the conveying direction, and being held to be displaceable in the height dimension of the conveying intermediate space against a restoring force such that each pressure element co-operates with the surface-deformable conveying cover during the passage of the products for consumption through the conveying path in order to form the variable conveyor cross-section and to work against the products for consumption, characterized in that pressure elements forming at least a partial row are each designed with a pressure-applying surface that determines the pressure-applying transverse profile, which pressure-applying surface is formed to have a convex profile cross-section over the entire pressure-applying transverse profile in order to apply pressure to the conveying cover and against the passing products for consumption.

2. Conveying apparatus according to claim 1, characterized in that the conveying cover is formed by a transport sector of a revolving transport belt movable by the conveyor drive, said transport sector taking the products for consumption with it for conveyance.

3. Conveying apparatus according to claim 1, characterized in that the second conveying surface is a transport contact surface forming a flat counter-surface.

4. Conveying apparatus according to claim 1, characterized in that all pressure elements are each designed with the convex pressure-applying surface in each case.

5. Conveying apparatus according to claim 1, characterized in that the convex pressure-applying surfaces are all designed the same.

6. Conveying apparatus according to claim 1, characterized in that all pressure elements with a convex pressure-applying surface at least of a partial row are designed the same and are arranged equidistantly in the width dimension of the conveying section of the intermediate space.

7. Conveying apparatus according to claim 1, characterized in that the distances between adjacent convex pressure-applying surfaces are small in relation to the convex profile cross dimensions of adjacent pressure-applying surfaces.

8. Conveying apparatus according to claim 1, characterized in that at least a partial row with the pressure elements each having the convex pressure-applying surface is allocated to a rising or falling soft part area of products for consumption to be conveyed.

9. Conveying apparatus according to claim 1, characterized in that the pressure elements comprise rod-shaped elements extending over the conveying space corresponding to the conveying direction.

10. Conveying apparatus according to claim 9, characterized in that the rod-shaped elements are hinged to be pivotably movable against a restoring force on a pivot axis oriented transversely to the conveying direction.

11. Conveying apparatus according to claim 10, characterized in that the pivot axis hinging the rod-shaped elements is arranged on an entry side of the conveying section of the intermediate space and the rod-shaped elements are each attached to the pivot axis in a swivelling manner on their one end.

12. Conveying apparatus according to claim 1, characterized in that the convex pressure-applying surface is formed by the surface of a circle section of the pressure-applying profile of the pressure element.

13. Conveying apparatus according to claim 1, characterized in that the convex pressure-applying elements at least of a partial row of pressure elements are formed by cylindrical elements extending in accordance with the conveying direction having a circular cross-section forming the convex pressure-applying surface.

14. Conveying apparatus according to claim 13, characterized in that the circular cylindrical elements are rollers extending in the conveying direction, which are mounted to rotate freely on their roller axes.

15. Processing machine, comprising at least one processing device with at least one cutting tool for separating at least a part of products for consumption conveyed in a row and a conveying apparatus upstream of the processing device, wherein the processing device is arranged directly at the end of a conveying section of the intermediate space of the conveying apparatus which conveys the products for consumption in a row, characterized in that the conveying apparatus is designed according to claim 1.

16. Processing machine according to claim 15, characterized in that said processing device is designed with a cutting tool which works transversely to the conveying direction, said tool being designed to separate a surface layer from a side of conveyed products for consumption which lie flat on the second conveying surface, particularly for removing a surface layer on the underside of fish fillets.

17. Processing machine according to claim 16, characterized in that the processing machine is designed as a skinning machine for removing first an upper normal layer and then a deep layer on the underside of fish fillets comprising, assigned to the normal layer and the deep layer, respectively, a first separating station for separating the normal layer and a second separating station for separating the deep layer, wherein a conveying apparatus according to claim 1 is arranged upstream of the separating station for separating the deep layer.

18. Processing machine according to claim 17, characterized in that the conveying apparatus upstream of the second separating station is also part of a means of conveyance arranged before the first station, said means comprising a driven transport belt with a transport sector which extends from an area upstream of the first separating station up into the area of the second separating station, and in which the conveying apparatus is designed upstream of each separating station according claim 1.

* * * * *